United States Patent
Sen et al.

(10) Patent No.: US 12,360,959 B2
(45) Date of Patent: Jul. 15, 2025

(54) PARTIAL LAYOUT COMMIT

(71) Applicant: Dell Products L.P., Round Rock, TX (US)

(72) Inventors: Soumyadeep Sen, Summit, NJ (US); JeanPierre Bono, Westboro, MA (US); Sitaram Pawar, Shrewsbury, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 18 days.

(21) Appl. No.: 18/356,833

(22) Filed: Jul. 21, 2023

(65) Prior Publication Data

US 2025/0028689 A1    Jan. 23, 2025

(51) Int. Cl.
*G06F 16/10* (2019.01)
*G06F 16/17* (2019.01)
*G06F 16/182* (2019.01)
*G06F 16/20* (2019.01)
*G06F 16/23* (2019.01)

(52) U.S. Cl.
CPC ...... *G06F 16/1827* (2019.01); *G06F 16/1727* (2019.01); *G06F 16/1734* (2019.01); *G06F 16/2379* (2019.01)

(58) Field of Classification Search
CPC ............. G06F 16/1827; G06F 16/1727; G06F 16/1734; G06F 16/2379
See application file for complete search history.

(56) References Cited

U.S. PATENT DOCUMENTS

| | | | |
|---|---|---|---|
| 8,510,265 B1 * | 8/2013 | Boone ................ | G06F 16/1827 707/790 |
| 9,213,717 B1 * | 12/2015 | Pawar ................ | G06F 16/1774 |
| 2014/0379767 A1 * | 12/2014 | Halevy ............... | H04L 67/1097 707/827 |

OTHER PUBLICATIONS

C. Hellwig, Parallel NFS (pNFS) RDMA Layout, 2022 [retrieved Oct. 3, 2024]. Retrieved from the Internet: https://web.archive.org/web/20220524073500/https://datatracker.ietf.org/doc/draft-hellwig-nfsv4-rdma-layout/00/ (Year: 2022).*

* cited by examiner

*Primary Examiner* — Kristopher Andersen
(74) *Attorney, Agent, or Firm* — Amin, Turocy & Watson, LLP

(57) ABSTRACT

Partial commits of file layouts can be performed and managed. In response to a file layout request from a client device (CD), a server can communicate, to CD, first extent list data, comprising a first mapping of a group of blocks, in a data store of the server, to which CD is able to write data to the file. CD can write, and track the writing of, data to first blocks, but not second blocks, of the group of blocks. CD can generate second extent list data comprising a second mapping of the first blocks in the data store to which data is written. CD can communicate a partial commit request, comprising the second extent list data, to the server. In response to the partial commit request, the server can commit the second mapping relating to the first blocks to the data store.

20 Claims, 10 Drawing Sheets

PARTIAL LAYOUT COMMIT

BACKGROUND

A device (e.g., communication device, node, or other type of device) can communicate with a server to write data to, and store data in, a server, read data from the server, or to otherwise interact with or perform operations in conjunction with the server. For instance, the device can write data to a file where the data can be stored in storage locations (e.g., blocks) in a data store of the server.

The above-described description is merely intended to provide a contextual overview regarding devices and servers, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise, in response to a request to obtain a file layout relating to a file from a client device, communicating, by a system comprising a processor, first extent list information to the client device, wherein the first extent list information can comprise a first mapping of a group of blocks in a data store of a server, and wherein the client device can be able to write data associated with the file to the group of blocks in the data store. The method also can include, in response to a commit request to have a partial commit of the file layout performed, performing, by the system, a partial commit operation to commit, to the data store, mapping information relating to a second mapping that can indicate a subgroup of blocks of the group of blocks in the data store to which the client device has written the data based on second extent list information, comprising the mapping information, that can be received from the client device in connection with the commit request.

In certain embodiments, the disclosed subject matter can comprise a client device that can comprise a memory that can store computer executable components, and a processor that can execute computer executable components stored in the memory. The computer executable components can comprise a write component that can write respective items of data to respective first storage locations in a data store of a server based on first extent list data comprising a first mapping of a group of storage locations in the data store of the server, wherein the write component can be able to write the respective items of data associated with a file to the group of storage locations in the data store, and wherein the group of storage locations can comprise the respective first storage locations and respective second storage locations. The computer executable components also can comprise a commit requestor component that can communicate, to the server, a commit request, comprising second extent list data, that can request the server to perform a partial commit operation to commit a second mapping that can indicate the respective first storage locations in the data store to which the write component has written the data based on the second extent list data comprising the second mapping.

In still other embodiments, the disclosed subject matter can comprise a non-transitory machine-readable medium, comprising executable instructions that, when executed by a processor, can facilitate performance of operations. The operations can comprise: in response to a request to obtain a file layout relating to a file from a client device, transmitting first extent list information to the client device, wherein the first extent list information can comprise a first mapping of a group of storage locations in a data store of a server, and wherein the group of storage locations in the data store can be usable by the client device to write data to the file. The operations also can comprise, based on the monitoring, determining the respective processing states of the respective service requests associated with the respective services. The operations further can comprise: in response to a commit request to have a partial commit of the file layout performed, performing a partial commit operation to commit, to the data store, a second mapping that can indicate a first subgroup of storage locations of the group of storage locations in the data store to which the client device has written the data based on second extent list information, comprising the second mapping, that can be received from the client device in connection with the commit request, wherein the group of storage locations can comprise the first subgroup of storage locations and a second subgroup of storage locations.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
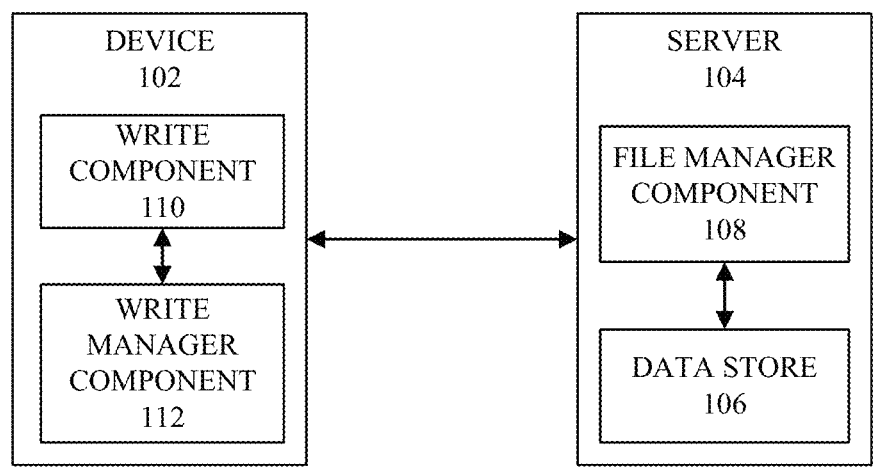
FIG. 1 illustrates a block diagram of a non-limiting example system that can desirably perform and manage commits, including partial commits, of file layouts associated with files to a data store of a server, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to performing file layout commits, including partial file layout commits, to facilitate (e.g., enable) fetching of relatively larger file layouts in a parallel network file system (pNFS) architecture that can employ pNFS client devices and pNFS servers. In a pNFS system that employs a pNFS architecture, a client device can obtain a file layout from the server. The client device can utilize the file layout to facilitate writing data to the data store of the server directly without the server (e.g., server processing resources of the server) having to be in the data write stack. At the end of a write operation, the client device can invoke a commit layout to commit the file layout on the server.

Existing file layouts can be relatively smaller. Smaller file layout commits can negatively impact (e.g., decrease, inhibit, or otherwise negatively impact) performance on the server, and the system overall, due to contention of the filesystem and file metadata resources of the server. Also, existing techniques for committing file layouts to the data store of the server can involve an all or nothing commit operation such that, when the commit is called to commit the file layout (e.g., associated with a get layout call), the entire file layout is committed to the server (e.g., the data store in the server). Conversely, if the client device calls or requests an abort operation with regard to the file layout, the server can discard all of the data (e.g., client data) written to the file by the client device during the write operation, and the metadata associated with the get layout call can be discarded as well.

In the pNFS architecture, it can be desirable to achieve higher input/output operations per second (IOPs). However, the relatively smaller size of existing file layouts and the all or nothing nature of existing file layout commit operations can quickly translate into an undesirably (e.g., unwanted, inefficient, or otherwise undesirable)) higher number of file layout commits to the server. It can be desirable to overcome these and other deficiencies of the existing techniques relating to writing of data of files to a server and committing file layouts to the server.

To facilitate achieving higher IOPs and enhance performance of the server and the system overall, it can be desirable to reduce the number of commits on the server. The disclosed subject matter can comprise a system, including one or more client devices and one or more servers, where relatively larger file layouts (e.g., 4 MB, 8 MB, or other relatively larger sized file layout that can be greater or less than 4 MB or 8 MB) can be employed with regard to write operations performed by a client device to a data store of the server. For instance, the client device can request (e.g., via a get layout call to the server) or fetch a relatively larger file layout from the server. The relatively larger file layouts also can be tunable (e.g., automatically or dynamically adjustable) depending in part on the conditions or characteristics associated with the client device and/or server. The relatively larger file layouts can reduce the number of commits that have to be performed by the server.

Also, with the file layouts being relatively larger, there can be instances where the client device may not want to write as much data to the file as the amount of data of the relatively larger file layout. In such instances, it can be desirable for the server to perform, and, in accordance with various embodiments, the server can perform partial commits of file layouts, instead of having to perform an all or nothing operation where either the entire file layout is committed or the entire file layout is discarded or aborted, such as described herein.

To that end, techniques for desirably (e.g., efficiently, suitably, enhancedly, or optimally) performing and managing commits, including partial commits, of file layouts associated with files to a data store of a server, are presented. In some embodiments, a system can comprise a server that can be associated with (e.g., communicatively connected to) a client device. The server can maintain an in-memory state of a filesystem block mapping of a filesystem corresponding to file offsets associated with files and associated with a data store of the server. In response to a request for a file layout received from the client device, the server can preallocate a group of storage locations (e.g., blocks) in the data store to make the group of storage locations available for writing data to the file, and can communicate first extent list data relating to the group of storage locations to the client device. The first extent list data can comprise a list of first extents and/or a first mapping of the group of storage locations, in the data store of the server, to which the client device is able to write data to the file. The list of first extents and/or the first mapping can comprise information (e.g., extent and/or mapping information) such as, for example, device offsets associated with the group of storage locations of the data store that is part of the file layout, file offsets associated with the file, storage offsets associated with the group of storage locations, the lengths of the first extents, the states of the first extents, and/or other desired information.

In some embodiments, the client device, employing a write component, can write data directly to storage locations of the group of storage locations in the data store of the server out of band from the server, based at least in part on the first extent list data, in accordance with the file layout. In some instances, the client device may not write data to all of the storage locations of the group of storage locations associated with the file layout. For instance, the client device can write respective items of data to respective first storage locations of the group of storage locations, while not writing any data to second storage locations of the group of storage locations. As a result of such writing, the respective items of data can be persisted in the respective first storage locations of the data store. The client device can track the writing of the respective items of data to the respective first storage locations of the group of storage locations. Based at least in part on the tracking of the writing of the respective items of data to the respective first storage locations, the client device can determine and generate second extent list data comprising a second mapping relating to the first storage locations in the data store to which data is written. The list of second extents and/or the second mapping can comprise information (e.g., extent and/or mapping information) such as, for example, device offsets associated with the respective first storage locations of the data store, file offsets associated with the file, storage offsets associated with the respective first storage locations, the lengths of the second extents, and/or states of the second extents, with regard to the respective items of data written to the respective first storage locations in the data store.

The client device can communicate a commit request, comprising the second extent list data, to the server, wherein the commit request can request that the server perform a partial commit operation with regard to the file layout. In response to the commit request, the server can perform a partial commit operation to commit (e.g., perform a partial commit), to the data store, the second mapping relating to the respective items of data stored in the respective first storage locations, based at least in part on the results of an analysis of the second extent list data received from the client device as part of or in connection with the commit request. As a result of the partial commit operation, the second mapping relating to the respective items of data stored in the respective first storage locations can be persisted in the data store.

In some embodiments, as part of the analysis of the second extent list data, the server not only can determine or identify the respective first storage locations to which the respective items of data were written, but also can determine or identify second storage locations of the group of storage locations to which the client device did not write any data. For instance, as part of the analysis of the second extent list data and/or the first extent list data (e.g., comparison of the second extent list data and the first extent list data), the server can identify which extents, which were in the first extent list data, were not in the extents, and associated first storage locations, of the second extent list data to which the respective items of data were written, wherein the extents of the first extent list data that were not in the second extent list data can be associated with the second storage locations to which the client device did not write any data. As part of, or in connection with, the partial commit operation, the server can mark (e.g., tag) the second storage locations and/or associated extents as candidates for release. The server can release the second storage locations and/or associated extents to enable the second storage locations and/or associated extents to be available for use to store other data associated with another file(s) by the client device or another client device.

These and other aspects and embodiments of the disclosed subject matter will now be described with respect to the drawings.

Referring now to the drawings, FIG. 1 illustrates a block diagram of a non-limiting example system 100 that can desirably (e.g., efficiently, suitably, enhancedly, or optimally) perform and manage commits, including partial commits, of file layouts associated with files to a data store of a server, in accordance with various aspects and embodiments of the disclosed subject matter. The system 100 can comprise a device 102 (e.g., communication device, node, or node equipment or device). The device 102 also can be referred to as a client device. At desired times, the device 102 can be associated with (e.g., communicatively connected) a server 104 (e.g., server component, device, or equipment) to facilitate communication of data between the device 102 and the server 104, and/or storage of data in a data store 106 of or associated with the server 104. It is to be appreciated and understood that, while the system 100 depicts the device 102 and the server 104, in other embodiments, the system 100 can comprise more than one device and/or more than one server, wherein one or more devices, such as the device 102, can be associated with the server 104 or can be respectively associated respective servers, comprising the server 104. In certain embodiments, the server 104 can be part of a group of servers that can operate as a node network (e.g., a node network of server nodes) where a device (e.g., device 102) can connect to the node network, which can result in the device being connected to a server of the node network.

The device 102, can be a computer, a laptop computer, a server, a wireless, mobile, or smart phone, electronic pad or tablet, a virtual assistant (VA) device, electronic eyewear, electronic watch, or other electronic bodywear, an electronic gaming device, an Internet of Things (IoT) device (e.g., health monitoring device, toaster, coffee maker, blinds, music players, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device 102 can be associated with (e.g., communicatively connected to) the server 104 via a communication connection and channel, which can include a wireless or wireline communication connection and channel.

In certain embodiments, the device 102 and/or one or more other devices can be associated with (e.g., communicatively connected to) the server 104 and/or one or more other servers, and/or each other, via a communication network (not explicitly shown) via respective communication connections and channels, which can include wireless or wireline communication connections and channels. The communication network can comprise various network equipment (e.g., routers, gateways, transceivers, switches, base stations, access points, radio access networks (RANs), or other devices) that facilitate (e.g., enable) communication of information between respective items of network equipment of the communication network, communication of information between the one or more devices (e.g., device 102) and the communication network, and communication of information between the devices and the one or more servers (e.g., server 104) or between each other. The communication network can provide or facilitate wireless or wireline communication connections and channels between the one or more devices (e.g., device 102), and respectively associated services, and the communication network. For reasons of brevity or clarity, the various network equipment, components, functions, or devices of the communication network are not explicitly shown.

The server 104 can comprise a data store 106, which can comprise non-volatile and/or volatile memory that can be utilized to store data, such as described herein. The data store 106 can comprise storage locations (e.g., blocks) in which data can be stored. At various times, the device 102 can desire to write data, such as data of a file, to the data store 106 of the server 104. In some embodiments, the device 102 can write data directly to storage locations in the data store 106 of the server 104 out of band from the server 104, such as described herein. The device 102 can write data to the storage locations of the data store 106, in accordance a file layout that the device 102 can receive from the server 104. In certain embodiments, to facilitate the device 102 being able to directly write data to the data store 106 of the server 104 out of band from the server 104 (e.g., without involving the server (e.g., server processing resources) in the data write stack), the device 102 can be a pNFS device and the server 104 can be a pNFS server that can allow the device 102, and/or one or more other pNFS devices, to access the data store 106 of the server 104 directly and in parallel, in accordance with an NFS or pNFS protocol (e.g., NFS version 4.1 standard protocol or other suitable or compatible NFS protocol).

It can be desirable (e.g., wanted, needed, or otherwise desirable) to persist the written data and the file layout in the data store 106, as the file layout can indicate where the data is written in the data store 106. When the data is written to the storage locations in the data store 106 by the device 102, the data can be persisted in the data store 106. The server 104 can perform a commit operation (e.g., at the request of the device 102) to commit and store the associated file layout in the data store 106 to persist the file layout in the data store 106.

As disclosed, to enhance efficiency and performance of the system 100, the server 104 can communicate a relatively larger file layout (e.g., 4 MB, 8 MB, or other relatively larger sized file layout that can be greater or less than 4 MB or 8 MB) to the device 102 to facilitate avoiding or reducing the number of smaller write layout commit calls or requests to commit the smaller write layouts to the data store 106 of the server 104. With the relatively larger file layout size, there may be instances where the device 102 does not desire to write data to all of the storage locations of the file layout in the data store 106, but still desires to commit the metadata of the file layout to the data store 106. As a result, it can be desirable to have the server 104 perform a partial commit operation to commit the portion of the file layout with regard to which the device 102 has written data to storage locations in the data store 106 of the server 104.

To that end, techniques for desirably (e.g., efficiently, suitably, enhancedly, or optimally) performing and managing, commits, including partial commits, of file layouts associated with files to the data store 106 of the server 104, are presented. The server 104 can maintain an in-memory state of a filesystem block mapping of a filesystem corresponding to file offsets associated with files and associated with the data store 106 of the server 104.

In accordance with various embodiments, the server 104 can comprise a file manager component 108 that can manage and perform various operations relating to data writes by devices (e.g., clients devices), such as the device 102, including providing file layouts to devices, preallocating storage locations of the data store 106 to the file layouts, performing commits, including partial commits, of file layouts, and/or other desired operations relating to write operations and commits, such as described herein.

In response to a request for a file layout received from the device 102, the file manager component 108 can preallocate a group of storage locations in the data store 106, and can communicate first extent list data to the device 102. The first extent list data can comprise a list of first extents and/or a first mapping of the group of storage locations in the data store 106 to which the device 102 is able to write data to the file. The list of first extents and/or the first mapping can comprise information (e.g., extent and/or mapping information) such as, for example, device offsets associated with the group of storage locations of the data store 106 that is part of the file layout, file offsets associated with the file, storage offsets associated with the data store 106, the lengths of the first extents, the states of the first extents, and/or other desired information. A device offset associated with an extent can identify or indicate a logical volume of the data store 106 on which an extent of the file is stored. A file offset associated with an extent can identify or indicate a starting byte offset in the file. An extent length associated with an extent can identify or indicate the size in bytes of the extent. A storage offset associated with an extent can identify or indicate a starting byte offset in the volume of the data store 106. An extent state associated with an extent can identify or indicate a state of the extent. Each extent can comprise or be associated with such other metadata (e.g., device offset, file offset, storage offset, extent length of the extent, extent state, and/or other desired metadata).

The device 102, employing a write component 110, can write respective items of data of the file to respective first storage locations of the group of storage locations of the data store 106, in accordance with the file layout, including the list of first extents and/or the first mapping. At this point, the respective items of data can be persisted in the data store 106, although the file layout, which can indicate where the respective items of data are stored in the data store 106, is not yet persisted in the data store 106. The device 102 also can comprise a write manager component 112 that can manage and perform various operations relating to writing data to the data store 106, including tracking the writing of the respective items of data to the respective first storage locations, such as described herein. In some instances, the device 102 may not write data to all storage locations (e.g., may not write data to second storage locations of the group of storage locations) associated with the file layout, but can still desire to save and close the file, and/or commit the partial file layout with regard to the portion of the file layout associated with the storage locations in the data store 106 to which the device 102 did write data.

Based at least in part on the tracking of the writing of the respective items of data to the respective first storage locations of the data store 106, the write manager component 112 can determine and generate second extent list data comprising a second mapping relating to the first storage locations in the data store 106 to which the respective items of data have been written. The list of second extents and/or the second mapping can comprise information (e.g., extent and/or mapping information) such as, for example, device offsets associated with the respective first storage locations of the data store 106, file offsets associated with the file, storage offsets associated with the respective first storage locations, the lengths of the second extents, and/or the states of the second extents, with regard to the respective items of data written to the respective first storage locations in the data store 106 of the server 104. The write manager component 112 can communicate a commit request, comprising the second extent list data, to the server 104, wherein the commit request can request that the server 104 perform a partial commit operation with regard to the file layout.

In response to the commit request, the server 104, employing the file manager component 108, can perform a partial commit operation to commit (e.g., perform a partial commit), to the data store 106, the second mapping relating to the respective items of data stored in the respective first storage locations of the data store 106, based at least in part on the results of an analysis of the second extent list data received from the device 102 as part of or in connection with the commit request and/or the first extent list data the server 104 had communicated to the device 102 as part of the file layout, such as described herein. As a result of the partial commit operation, the second mapping relating to the respective items of data stored in the respective first storage locations can be persisted in the data store 106 of the server 104. The file manager component 108 also can identify the second storage locations associated with the file layout that the device 102 with regard to which the device 102 did not write data, and can release the second storage locations so that they can be available for use to store other data associated with another file(s) by the device 102 or another device, such as described herein.

Figure 2:
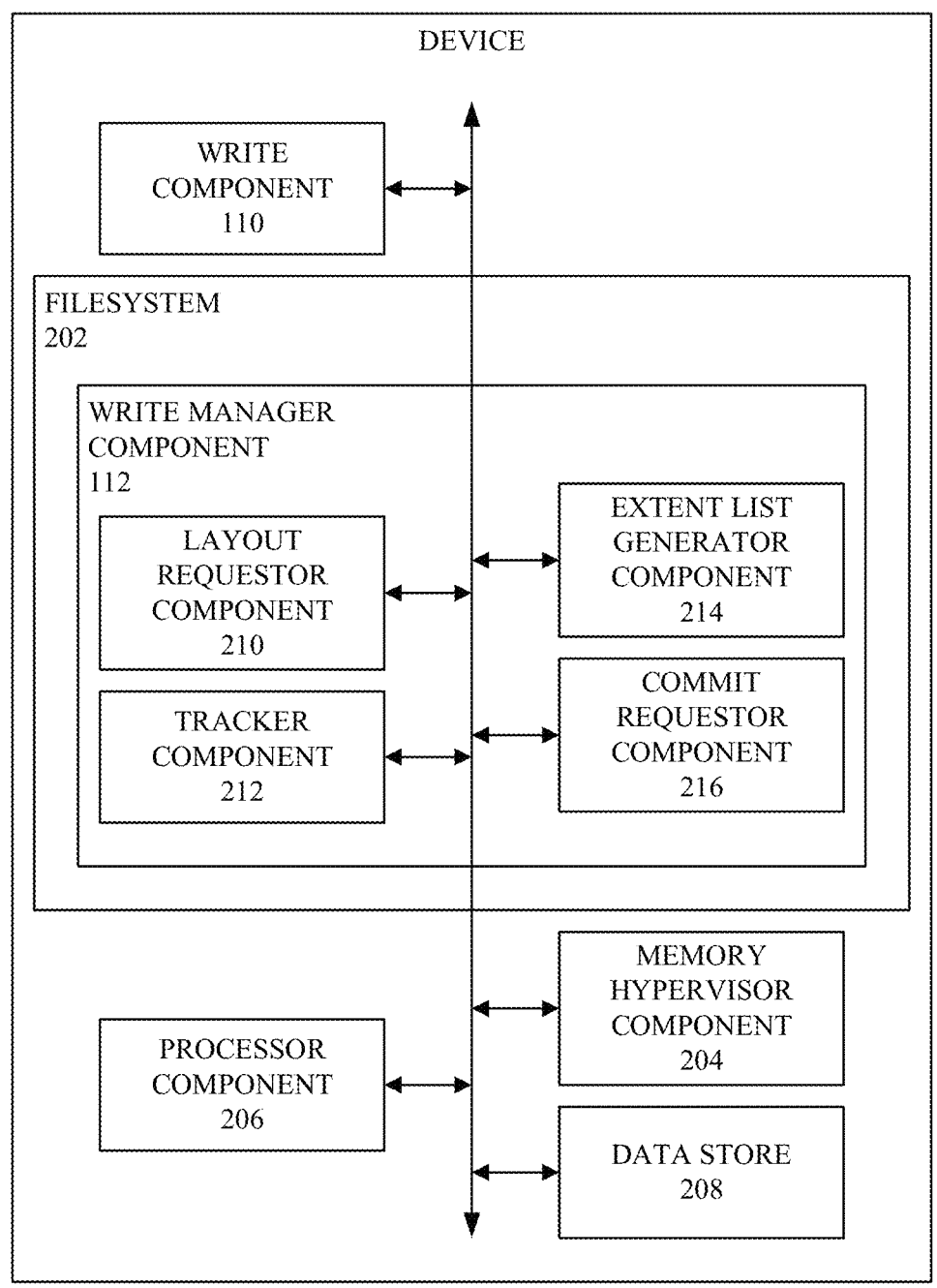
FIG. 2 depicts a block diagram of a non-limiting example device, in accordance with various aspects and embodiments of the disclosed subject matter.
Figure 3:
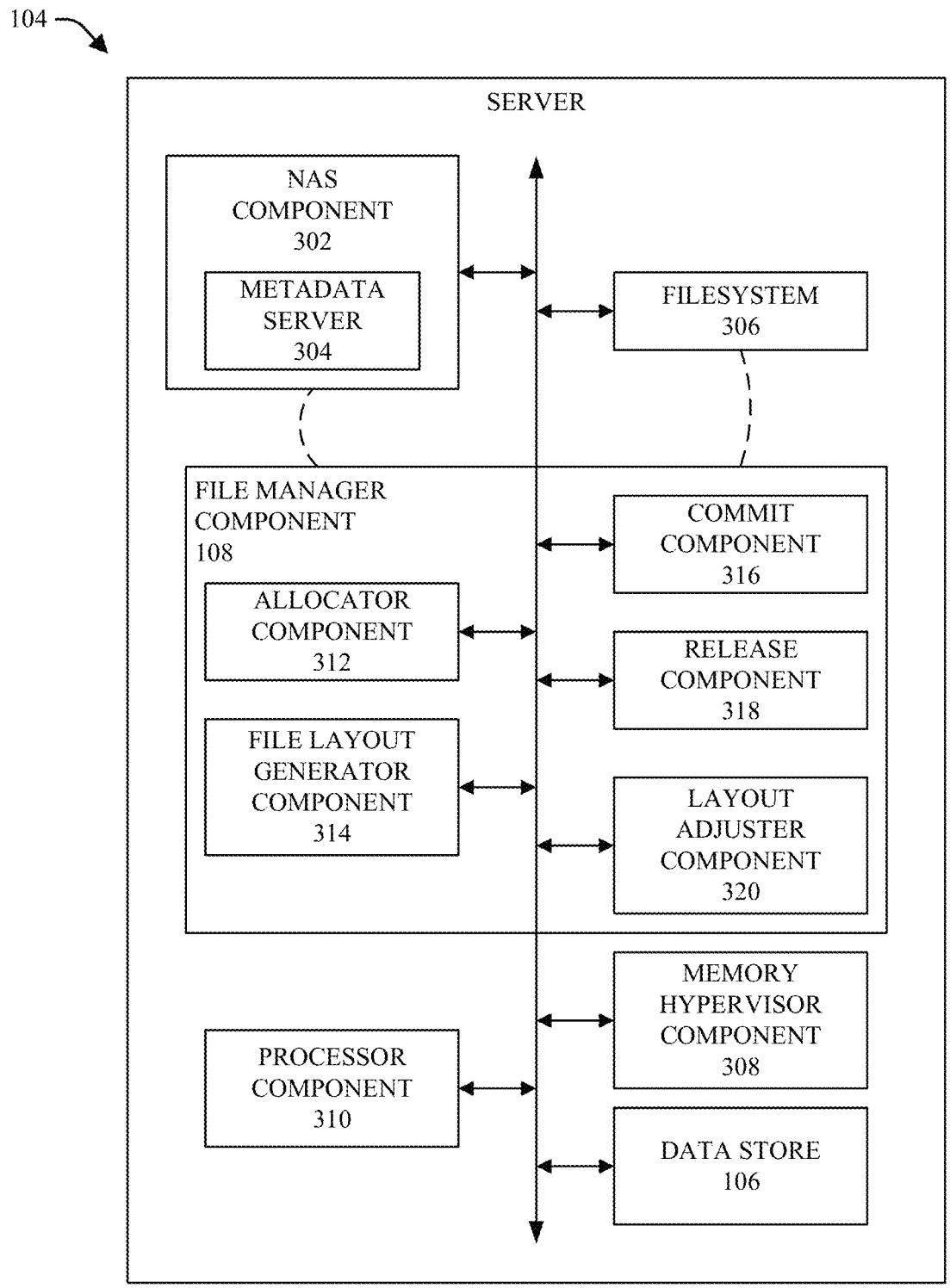
FIG. 3 depicts a block diagram of a non-limiting example server, in accordance with various aspects and embodiments of the disclosed subject matter.

Referring to FIGS. 2 and 3 (along with FIG. 1), FIG. 2 depicts a block diagram of a non-limiting example device 102, and FIG. 3 depicts a block diagram of a non-limiting example server 104, in accordance with the various aspects and embodiments of the disclosed subject matter. The device 102 can comprise a filesystem 202 (e.g., parallel filesystem) that can operate in parallel with the filesystem of the server 104 to facilitate direct writing of data by the device 102 to the data store 106 of the server 104 out of band of the server 104, such as described herein. The device 102 also can comprise a memory hypervisor component 204, a processor component 206, and one or more data stores, such as data store 208, that can be associated with the filesystem 202, each other, and/or other components of the device 102.

The one or more data stores (e.g., data store 208) can comprise non-volatile memory and/or volatile memory that can be utilized to store data, such as data of files, metadata associated with files, and/or other desired data. The memory hypervisor component 204 can facilitate interfacing or interactions between the filesystem 202 and the one or more data stores (e.g., data store 208), and managing allocation of memory resources of the one or more data stores to the filesystem 202, the processor component 206, and/or other components of the device 102, including virtual machines (VMs) of or associated with the filesystem 202, the processor component 206, and/or other components of the device 102. In some embodiments, the one or more data stores (e.g., data store 208) of the device 102 can comprise a non-volatile memory express (NVMe) or NVMe over fabric (NVMe-oF) data store and/or a persistent memory (PMEM) or PMEM-OF data store, although, in other embodiments, the one or more data stores can comprise another type of data store or memory.

In accordance with various embodiments, the filesystem 202 can comprise or be associated with the write component 110 and/or the write manager component 112 to facilitate the writing of the data (e.g., data of files) to a server, such as the server 104, writing of data to the one or more local data stores (e.g., data store 208) of the device 102, and/or the management of the writing of data and files to the server (e.g., server 104) or the one or more local data stores of the device 102, such as described herein.

With regard to the server 104, in accordance with various embodiments, the server 104 can comprise a network attached storage (NAS) component 302, which can comprise or be associated with a metadata server component 304. The NAS component 302 and metadata server component 304 can manage the writing, reading, and/or storage of data to, from, and/or in one or more data stores (e.g., data store 106) or other memory of the server 104. The metadata server component 304 can determine and generate metadata, such as metadata relating to file layouts associated with files, to facilitate the writing of data (e.g., by devices, such as the device 102) to the data store 106, wherein the metadata can comprise extent list data, mappings relating to storage locations in the data store 106, device offsets associated with the one or more data stores (e.g., data store 106), file offsets associated with files, storage offsets associated with the one or more data stores, extent lengths of extents, states of extents, or other type of metadata.

The server 104 also can comprise a filesystem 306 that can manage files stored in the one or more data stores (e.g., data store 106) of the server 104. In some embodiments, the filesystem 306 can operate in parallel with the filesystem 202 of the device 102 to facilitate (e.g., enable) the device 102 directly writing data to the data store 106 of the server 104 out of band of the server 104, such as described herein. The server 104 further can comprise a memory hypervisor component 308, a processor component 310, and the one or more data stores, such as data store 106, that can be associated with the NAS component 302, the filesystem 306, each other, and/or other components of the server 104.

The one or more data stores (e.g., data store 106) can comprise non-volatile memory and/or volatile memory that can be utilized to store data, such as data of files, metadata associated with files, and/or other desired data. The memory hypervisor component 308 can facilitate interfacing or interactions between the filesystem 306 and the one or more data stores (e.g., data store 106), and managing allocation of memory resources of the one or more data stores to the filesystem 306, the processor component 310, and/or other components of the device 102, including VMs of or associated with the filesystem 306, the processor component 310, and/or other components of the server 104. In some embodiments, the one or more data stores (e.g., data store 106) of the server 104 can comprise an NVMe or NVMe-oF data store and/or a PMEM or PMEM-OF data store, although, in other embodiments, the one or more data stores can comprise another type of data store or memory.

In accordance with various embodiments, the NAS component 302 or filesystem 306 can comprise or be associated with the file manager component 108 to facilitate performing and/or managing commits of file layouts or partial file layouts associated with files to the server 104, such as described herein. For instance, the file manager component 108 can be part of the filesystem 306, can be part of NAS component 302, can be separate from and associated with (e.g., communicatively connected to) the filesystem 306 and NAS component 302, or can have respective components of the file manager component 108 that can be part of the filesystem 306, the NAS component 302, or separate from and associated with the filesystem 306 and NAS component 302. (In FIG. 3, the dotted line between the file manager component 108 and the filesystem 306, and the dotted line between the file manager component 108 and the NAS component 302, are intended to indicate that the file manager component 108 can be part of the filesystem 306, can be part of NAS component 302, can be separate from and associated with the filesystem 306 and NAS component 302, or can have respective components of the file manager component 108 that can be part of the filesystem 306, the NAS component 302, or separate from and associated with the filesystem 306 and NAS component 302.) When the device 102, or associated user, desires to write data to a file (e.g., a new file or existing file), the write manager component 112 of the device 102, employing a layout requestor component 210, can communicate a request to obtain a file layout relating to the file to the server 104 to facilitate writing data to the data store 106 of the server 104. The request to obtain the file layout can be in the form of a get layout call or other type of call or operation that can be utilized to request to obtain the file layout.

In response to receiving the request to obtain the file layout relating to the file from the device 102, the file manager component 108 of the server 104, employing an allocator component 312, can analyze information relating to storage locations of the data store 106, and, based at least in part on the results of such analysis, the allocator component 312 can determine a group of storage locations in the data store 106 that is available to write data to the file and can preallocate or assign the group of storage locations to the file layout and associated file. For instance, the allocator component 312 can identify a group of storage locations in the data store 106 that do not have any data (e.g., valid data) stored therein or that are otherwise available for use by the device 102 to write and store data associated with the file.

With regard to the group of storage locations, the file manager component 108 can employ a file layout generator component 314 that can generate the file layout associated with the file, and, as part of generating the file layout, can determine and generate first extent list data relating to the group of storage locations. The first extent list data can comprise a list of first extents and/or a first mapping of the group of storage locations in the data store 106 to which the device 102 is able to write data to the file. The list of first extents and/or the first mapping can comprise information (e.g., extent and/or mapping information) such as, for example, device offsets associated with the group of storage locations of the data store 106 that is part of the file layout, file offsets associated with the file, storage offsets associated with the group of storage locations, the lengths of the first extents, the states of the first extents, and/or other desired information relating to the file layout. The server 104 can communicate the file layout, comprising the first extent list data, relating to the file to the device 102. In some embodiments, the server 104 (e.g., the file manager component 108, metadata server component 304, or other component of the server 104) can maintain the state that can describe the group of storage locations (e.g., filesystem blocks) and other metadata resources that are preallocated corresponding to the file offsets from the file layout provided to the device 102 in response to the file layout request. The server 104 can utilize such information (e.g., metadata) relating to the state to facilitate performing the commit or partial commit operation, if and when the device 102 requests that a commit be performed with respect to the file, such as described herein.

Figure 4:
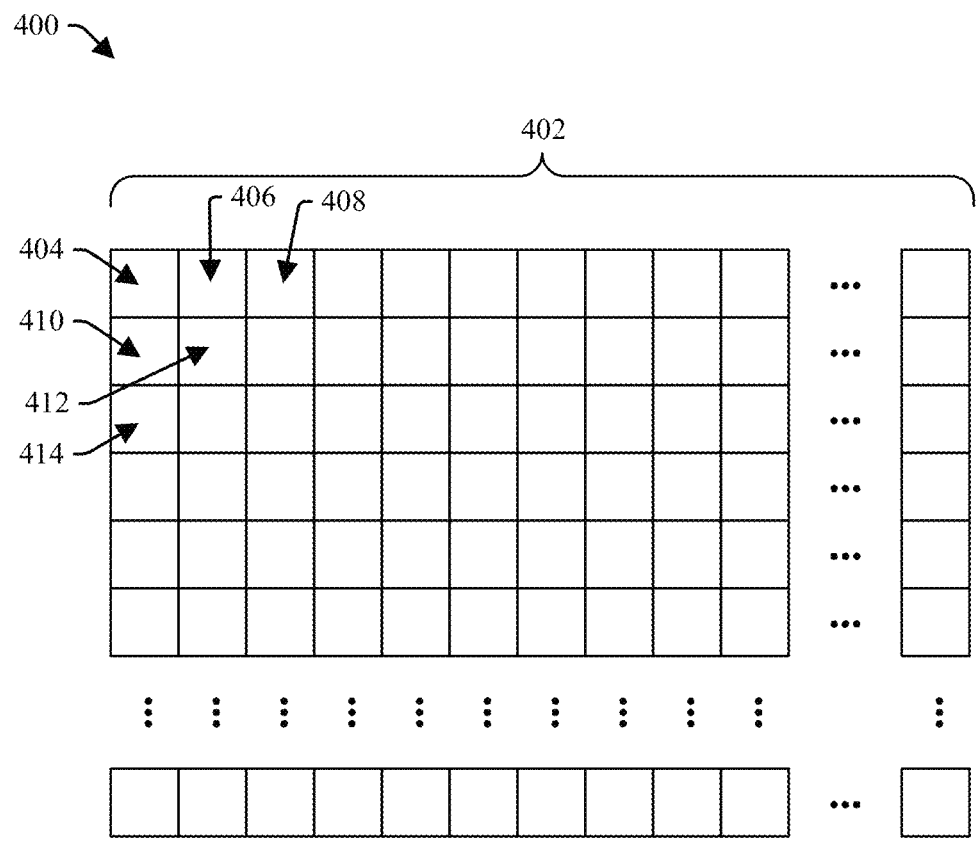
FIG. 4 illustrates a block diagram of a non-limiting example file layout relating to the group of storage locations, in accordance with the various aspects and embodiments of the disclosed subject matter.

Referring to FIG. 4 (along with FIGS. 1-3), FIG. 4 illustrates a block diagram of a non-limiting example file layout 400 relating to the group of storage locations, in accordance with the various aspects and embodiments of the disclosed subject matter. The example file layout 400 can comprise the group of storage locations 402 to which the device 102 can write data relating to the file. The group of storage locations 402 can comprise, for example, storage locations (e.g., blocks) 404, 406, 408, 410, 412, and 414, as well as the other storage locations depicted in the group of storage locations 402. As disclosed, the file layouts, including this file layout, generated by the file manager component 108 can be relatively larger than the file layouts and number of storage locations employed by existing techniques, to facilitate enhancing performance of the system 100. The number of storage locations in a file layout, such as file layout 400, can be based at least in part on the number of bytes per storage location and the overall size in megabytes (MB) of the file layout. For example, if each storage location can store 8 kilobytes (kB) of data, and the overall size of the file layout 400 is 4 MB, the number of storage locations in the file layout 400 can be 512 storage locations.

It is to be appreciated and understood that, while a file layout (e.g., file layout 400) can be 4 MB and can have 512 storage locations, in other embodiments, a file layout can have a size that can be greater or less than 4 MB and can have more or less than 512 storage locations. Also, in some embodiments, a storage location (e.g., 404) can have more or less than 8 kB. It also is to be appreciated and understood that storage locations (e.g., 404, 406, 408, 410, 412, and/or 414) can be comprised of storage sub-locations (e.g., on a byte or multi-byte level). In accordance with various embodiments, the file manager component 108 can perform commits or partial commits of file layouts on a storage location (e.g., block) level of granularity or on a storage sub-location (e.g., byte or multi-byte) level of granularity. It is to be further appreciated and understood that, while the example file layout 400 depicts the group of storage locations 402 as contiguous available or empty storage locations to which data may be written, in other embodiments, the storage locations in one or more regions of the data store 106 can comprise the available or empty storage locations (e.g., the storage locations 404, 406, 408, 410, 412, and 414 of the group of storage locations 402 of the file layout 400) and other storage locations, which can have data stored therein or which otherwise can be unavailable for inclusion in the file layout 400, such that some of the storage locations (e.g., 404, 406, 408, 410, 412, and/or 414) of the group of storage locations 402 of the file layout 400 can be non-contiguous with respective to each other. The file layout generator component 314 can determine and generate the first extent list data, including the device offsets associated with the group of storage locations 402 of the data store 106 that is part of the file layout 400, the file offsets associated with the file, the storage offsets associated with the group of storage locations 402, the number of extents, the respective lengths of the respective first extents (e.g., to account for the respective and relative locations of the storage locations with respect to each other and whether or not respective storage locations of the group of storage locations 402 are contiguous or not), the respective states of the respective first extents, and/or other desired metadata relating to the file layout (e.g., write file layout 400).

The device 102 can receive the file layout (e.g., 400), comprising the first extent list data, relating to the file from the server 104. The device 102 can utilize the file layout and associated first extent list data to write respective items of data to respective storage locations (e.g., 404, 406, 408, 410, 412, and/or 414) of the group of storage locations (e.g., 402) based at least in part on (e.g., in accordance with) the first extent list data. In some instances though, the device 102 may not write data to all of the storage locations of the group of storage locations. For instance, the device 102, employing the write component 110, can write respective items of data to respective first storage locations of the group of storage locations, while not writing any data to second storage locations of the group of storage locations. In some embodiments, the write component 110 of the device 102 can write the data directly to storage locations (e.g., 404, 406, 408, 410, 412, and/or 414) in the data store 106 of the server 104 out of band from the server 104 (e.g., without involving the server (e.g., server processing resources) in the data write stack).

Figure 5:
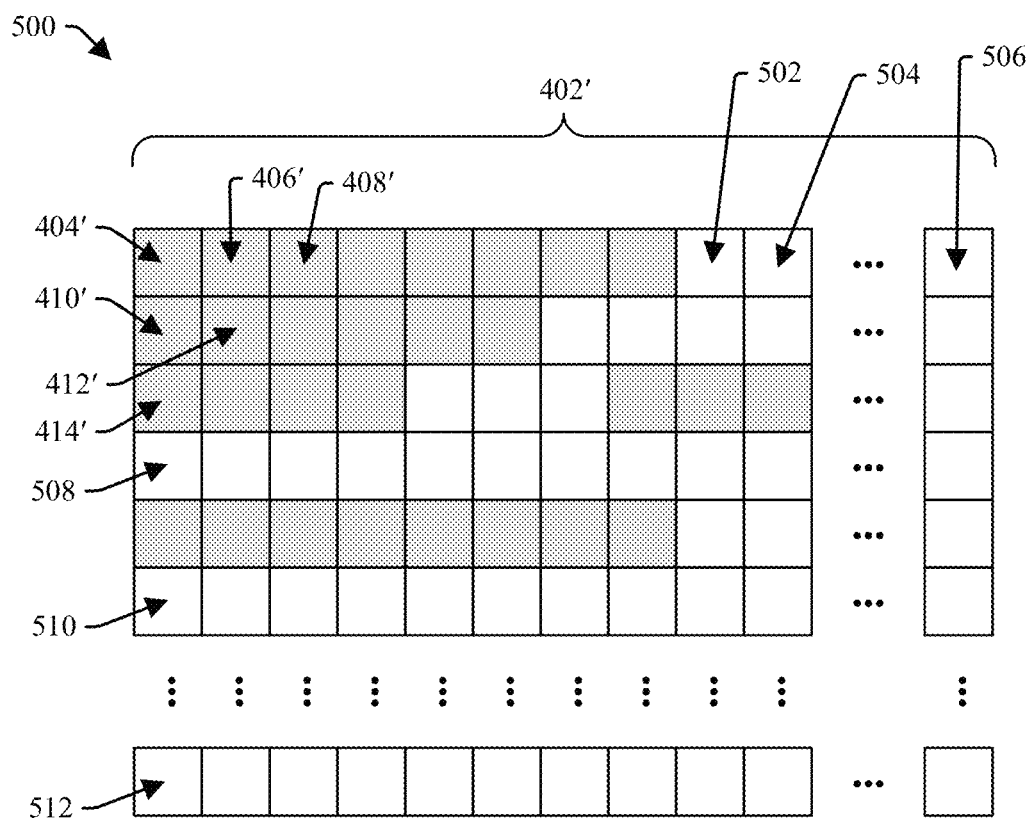
FIG. 5 depicts a block diagram of a non-limiting example write file layout relating to the group of storage locations, including the first storage locations to which data was written by the device and second storage locations with regard to which the device has not written data, in accordance with the various aspects and embodiments of the disclosed subject matter.

Referring to FIG. 5 (along with FIGS. 1-4), FIG. 5 depicts a block diagram of a non-limiting example write file layout 500 relating to the group of storage locations, including the first storage locations to which data was written by the device 102 and second storage locations with regard to which the device 102 has not written data, in accordance with the various aspects and embodiments of the disclosed subject matter. The example file layout 500 can comprise the group of storage locations 402', wherein the device 102, employing the write component 110, has written respective items of data to the first storage locations (e.g., first subgroup of storage locations), comprising storage locations (e.g., blocks) 404', 406', 408', 410', 412', and 414' (as well as other storage locations of the group) of the group of storage locations 402', and has not written data to the second storage locations, including storage locations 502, 504, 506, 508, 510, and 512, of the group of storage locations 402'. As disclosed, the write component 110 can write the respective items of data to the first storage locations based at least in part on (e.g., in accordance with) the first extent list data. The respective items of data stored in the respective first storage locations of the data store 106 can be persistent on the data store 106. It is to be appreciated and understood that the first storage locations (e.g., 404', 406', 408', 410', 412', and 414') depicted as being written to in the example write file layout 500 are merely exemplary, and the device 102 can write data to any of the available storage locations of the group of storage locations of the data store 106 associated with the file layout (e.g., file layout 400).

In some embodiments, in connection with, or during, the write component 110 writing the respective items of data to the respective first storage locations (e.g., 404', 406', 408', 410', 412', and 414') in the data store 106 of the server 104, the device 102, employing a tracker component 212 can monitor and/or track the writing of the respective items of data to the respective first storage locations in the data store 106 to facilitate identifying the respective first storage locations in the data store 106 to which the device 102 wrote data and the respective second storage locations (e.g., 502, 504, 506, 508, 510, and 512) in the data store 106 with regard to which the device 102 did not write data. For instance, the tracker component 212 can generate a list of storage locations (e.g., the first storage locations, such as storage locations 404', 406', 408', 410', 412', and 414') in the data store 106 to which the respective items of data have been written by the device 102 and/or metadata associated with such storage locations and/or can generate indicators that can indicate (e.g., flag or mark) the first storage locations in the data store 106 to which the respective items of data have been written by the device 102.

Figure 6:
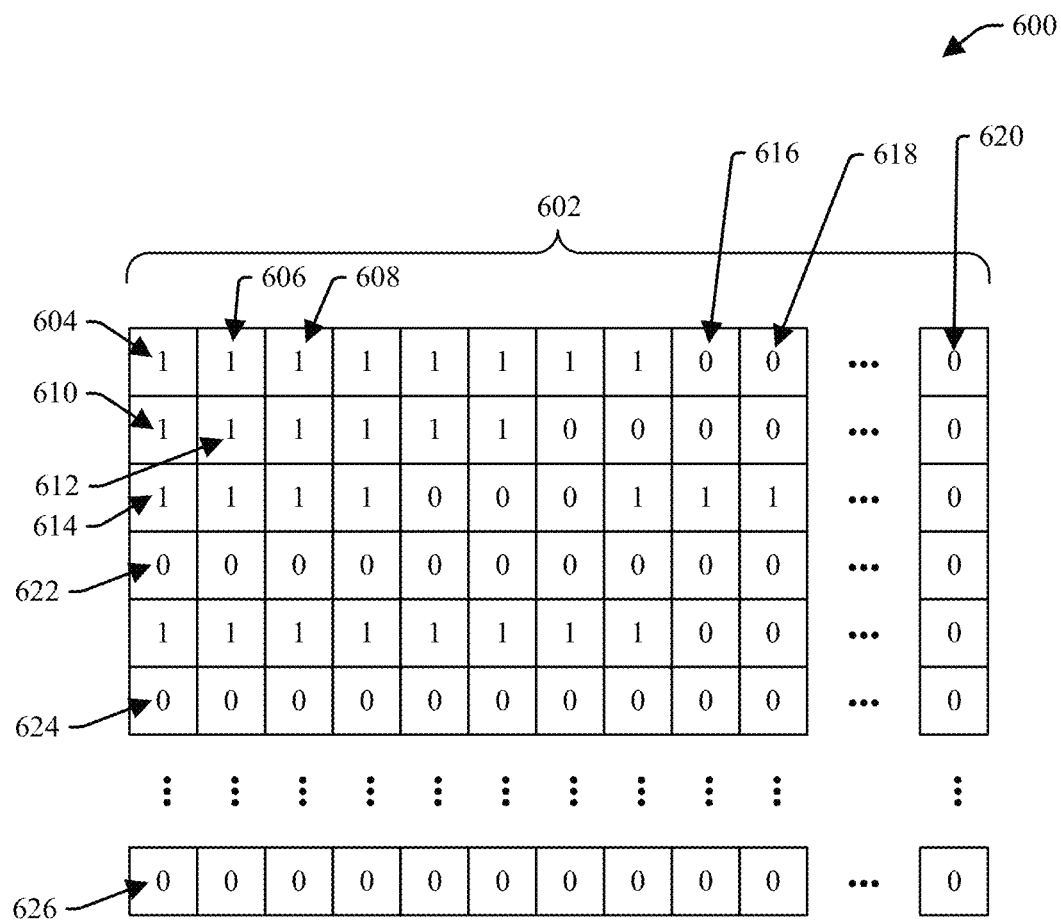
FIG. 6 illustrates a block diagram of a non-limiting example bitmap relating to the write file layout associated with the file and the tracking of the writing of the respective items of data to the first storage locations in the data store, in accordance with the various aspects and embodiments of the disclosed subject matter.

In certain embodiments, the tracker component 212 can generate and populate (e.g., sets respective bits on) a bitmap representative of the write file layout (e.g., write file layout 500) to indicate the respective first storage locations (e.g., 404', 406', 408', 410', 412', and 414') in the data store 106 of the server 104 to which the respective items of data have been written by the device 102 and the respective second storage locations (e.g., 502, 504, 506, 508, 510, and 512) in the data store 106 with regard to which the device 102 did not write data. Referring to FIG. 6 (along with FIGS. 1-5), FIG. 6 illustrates a block diagram of a non-limiting example bitmap 600 relating to the write file layout (e.g., 500) associated with the file and the tracking of the writing of the respective items of data to the first storage locations in the data store 106, in accordance with the various aspects and embodiments of the disclosed subject matter. The example bitmap 600 can comprise a group of bits 602 that can correspond to (e.g., can be associated with, mapped to, or linked to) the group of storage locations (e.g., 402 and/or 402', respectively) of the file layout 400 of FIG. 4 and/or write file layout 500 of FIG. 5. The respective bits of the group of bits 602 can have respective bit values, wherein, initially, the respective bit values of the respective bits can have a first bit value (e.g., a 0 bit value or indeterminate or unset bit value; or alternatively, a 1 bit value) or can be in a first state (e.g., unset or unwritten state). If and when the tracker component 212 sets or modifies a bit value of a bit of the group of bits, the bit value of the bit can have a second (e.g., written) bit value (e.g., a 1 bit value; or alternatively, a 0 bit value) or can be in a second state (e.g., set or written state).

In some embodiments, in connection with, or during, the write component 110 writing the respective items of data to the respective first storage locations (e.g., 404', 406', 408', 410', 412', and 414') in the data store 106, and based at least in part on the tracking of the writing of the respective items of data to the respective first storage locations in the data store 106, the tracker component 212 can set or modify bit values of respective first bits (e.g., first subgroup of bits), such as, for example, first bits 604, 606, 608, 610, 612, and 614, of the group of bits 602 that are associated with (e.g., correspond, mapped, or linked to) the first storage locations to the second bit value (e.g., bit value of 1 or the set bit value), from the first bit value, to indicate that the respective first storage locations have had respective items of data written to them. The tracker component 212 can maintain bit values of respective second bits (e.g., second subgroup of bits), such as, for example, second bits 616, 618, 620, 622, 624, and 626, of the group of bits 602 that are associated with (e.g., correspond, mapped, or linked to) the second storage locations (e.g., 502, 504, 506, 508, 510, and 512) at the first bit value (e.g., bit value of 0 or the unset bit value) to indicate that the respective second storage locations have not had data written to them.

It is to be appreciated and understood that, while the bit value of 1 is utilized in the example bitmap 600 to indicate a storage location (e.g., 404') associated with the bit with the 1 bit value in the bitmap 600 has had data written to it, and the bit value of 0 is utilized in the bitmap 600 to indicate a storage location (e.g., 502) associated with the bit with the 0 bit value in the bitmap 600 has not had data written to it, in other embodiments, a 0 bit value can be utilized to indicate that the associated storage location has had data written to it, and a 1 bit value can be utilized to indicate that the associated storage location has not had data written to it. It also is to be appreciated and understood that, while, in some embodiments, the tracker component 212 can utilize a bitmap to facilitate tracking writing of data to storage locations associated with a file layout, and while such a bitmap can be a desirably efficient way for tracking such writing of data to storage locations, in other embodiments, the tracker component 212 can utilize one or more other desired techniques, processes, indicators, or layouts to facilitate tracking or indicating which storage locations of the data store 106 that are associated with a file layout have had data written to them and which other storage locations of the data store 106 that are associated with the file layout have not had data written to them.

In some instances, even though the device 102 has not written data to all of the storage locations of the group of storage locations (e.g., 402) associated with the file layout (e.g., 400), the device 102 (e.g., a user or other entity associated with the device 102, or the device 102 itself) may desire to save the file, including the data that was written to the file, and/or close the file. At this point, while the respective items of data written to the respective first storage locations in the data store 106 are persisted in the data store 106, the metadata (e.g., extent list data, mapping, and/or other metadata) associated with the file layout (e.g., write file layout 500) associated with the file is not yet saved (e.g., stored) and persisted in the data store 106.

To facilitate saving and persisting the file layout, the device 102 can employ an extent list generator component 214 that can determine and generate second extent list data based at least in part on the writing of the respective items of data to the respective first storage locations (e.g., 404', 406', 408', 410', 412', and 414') in the data store and the tracking of such writing of data by the tracker component 212. In accordance with various embodiments, the extent list generator component 214 can determine the second extent list data based at least in part on the respective indicators that can indicate (e.g., flag or mark) the first storage locations (e.g., 404', 406', 408', 410', 412', and 414') in the data store 106 to which the respective items of data have been written by the device 102 and/or the respective indicators that can indicate the respective second storage locations (e.g., 502, 504, 506, 508, 510, and 512) that have not had data written to them, or based at least in part on the respective bit values of the respective bits (e.g., first bits 604, 606, 608, 610, 612, and 614, and second bits 616, 618, 620, 622, 624, and 626) of the group of bits 602 in the bitmap 600.

The second extent list data can comprise a list of the second extents and/or a second mapping that can comprise mapping information relating to the respective first storage locations (e.g., 404', 406', 408', 410', 412', and 414') in the data store 106 to which the client device wrote the respective items of data. The list of second extents and/or the second mapping can comprise information (e.g., extent and/or mapping information) such as, for example, device offsets associated with the respective first storage locations of the data store 106, file offsets associated with the file, storage offsets associated with the respective first storage locations, respective lengths of the second extents, states of the second extents, and/or other desired metadata relating to the file layout (e.g., write file layout 500) with regard to the respective items of data written to the respective first storage locations in the data store 106. The second extents in the second list of extents can comprise one or more of the first extents that were in the first extent list data associated with the original file layout (e.g., 400) received in response to the file layout request. The device 102 can employ a commit requestor component 216 that can communicate a commit request and the metadata (e.g., in connection with or as part of the commit request), including the second extent list data, associated with the file layout (e.g., write file layout 500) to the server 104 to request that the server 104 perform a partial commit operation to commit the second mapping associated with the file layout to the data store 106, wherein the second mapping can indicate the respective first storage locations (e.g., 404', 406', 408', 410', 412', and 414') in the data store 106 to which the write component 110 has written the respective items of data.

In response to receiving the commit request and associated metadata associated with the file layout and file, the server 104 can employ a commit component 316 that can perform the partial commit operation to commit and/or store the metadata, including the second mapping, to and/or in the data store 106, based at least in part on the metadata, including the second extent list data and/or the second mapping. The committing of the metadata associated with the file and file layout to the data store 106 can render the metadata persistent on the data store 106. This metadata associated with the file that is persisted in the data store 106 can enable the device 102, another device (e.g., another authorized device), and/or the server 104 to retrieve the respective items of data from the respective first storage locations in the data store 106, if and when desired.

In some embodiments, to facilitate committing the metadata associated with the file layout and file to the data store 106, the commit component 316 can analyze the metadata and/or the original file layout (e.g., file layout 400 and the metadata associated therewith), and can determine or identify the respective second extents associated with the second extent list, the second mapping associated with the file layout, the device offsets, the file offsets, the storage offsets, the respective extent lengths of the respective second extents, the respective states of the respective second extents, and/or other features associated with the metadata received from the device 102, and/or the respective first extents associated with the first extent list, the first mapping associated with the file layout, the device offsets, the file offsets, the storage offsets, the respective extent lengths of the respective first extents, the respective states of the respective first extents, and/or other features associated with the metadata associated with the file layout originally requested by the device 102. The commit component 316 can compare the received metadata, including the respective second extents, to the original metadata, including the respective first extents, and can identify or determine differences between the received metadata and the original metadata associated with the file layout. Based at least in part on the results of the analysis, including the comparison results, the commit component 316 can identify or determine which extents that were in the original first extents of the first extent list associated with the original file layout are not in the second extents of the second extent list associated with the write file layout received from the device 102. Accordingly, by knowing which extents (e.g., second extents) are in the received metadata, the commit component 316 can commit the second extents and/or other associated metadata associated with the write file layout (e.g., write file layout 500) to the data store 106. Also, based at least in part on the analysis results, the commit component 316 can mark (e.g., indicate, flag, or designate) the one or more first extents of the first extent list associated with the requested file layout (e.g., file layout 400) that were not in the received second list of extents associated with the received file layout (e.g., write file layout 500). The one or more first extents that were not in the received second list of extents can be associated with the second storage locations (e.g., 502, 504, 506, 508, 510, and 512) with regard to which the device 102 did not write data and/or other resources (e.g., preallocated metadata resources or other preallocated resources) associated with the one or more first extents.

In some embodiments, the server 104 can employ a release component 318 that can release the one or more first extents and/or other resources that were preallocated for use by, but not used by, the device 102, based at least in part on the marking of the one or more first extents by the commit component 316. The one or more first extents, the associated second storage locations (e.g., 502, 504, 506, 508, 510, and 512), and/or other resources that are released by the release component 318 can be available for use to store or facilitate storing other data associated with another file(s) by the device 102 or another device associated with the server 104.

It is to be appreciated and understood that the device 102 can have one or more files associated with one or more file layouts that can be open at the same time, wherein the device 102 can write data to the one or more files in accordance with the one or more file layouts. It also is to be appreciated and understood that the server 104 can manage respective file layouts associated with respective devices, including the device 102, in parallel or simultaneously, wherein the respective devices can write respective data to respective storage locations in the data store 106, in accordance with the respective file layouts, in parallel or simultaneously.

In certain embodiments, the server 104 can comprise a layout adjuster component 320 that can adjust (e.g., tune, customize, or modify) file layouts to increase or decrease the size of file layouts. For instance, the layout adjuster component 320 can analyze preferences (e.g., user preferences of a user, or device preferences of a device, such as the device 102), application-related data, file-related data, another characteristic(s) relating to files and file layouts, and/or historical information relating to files, applications, workloads (e.g., file-related workloads), users, and/or devices, to facilitate learning or determining a desirable size for file layouts. Based at least in part on the results of such analysis, the layout adjuster component 320 can learn, determine, or identify a desirable (e.g., suitable, wanted, enhanced, or optimal) file layout size or adjustment to a file layout size that can be employed for a file layout(s) associated with a file(s) associated with a device(s) (e.g., device 102), a user(s) associated with the device(s), an application(s) associated with the device(s), and/or a workload(s) associated with the device(s).

For example, a 4 MB file layout size may be currently used for file layouts. However, the analysis results by the layout adjuster component 320 can indicate that the particular device (e.g., device 102) or user frequently utilizes more than 4 MB and closer to 8 MB when writing to a file, or the type of application being utilized, or that often can be utilized, by the device or user frequently generates files that are greater than 4 MB in size and closer to 8 MB in size (e.g., during a write operation), a type of file being utilized, or that often can be utilized, by the device or user frequently has a size that is greater than 4 MB in size and closer to 8 MB in size (e.g., during a write operation), and/or workloads associated with the device, user, or application frequently involve writing more than 4 MB of data and closer to 8 MB of data. Based at least in part on such analysis results, the layout adjuster component 320 can determine or learn that an 8 MB file layout size can be more desirable for the particular device (e.g., device 102), or associated user, file (e.g., type of file), or application (e.g., type of application). Accordingly, the layout adjuster component 320 can determine that it can be desirable (e.g., suitable, enhanced, or optimal) to increase the size of the file layout from 4 MB to 8 MB, and can adjust or reconfigure (e.g., automatically or dynamically adjust or reconfigure) the file layout size to generate a file layout that can be 8 MB in size. The layout adjuster component 320 can determine respective file layout sizes that can be employed for file layouts on a per device, per user, per file, per application, per workload basis, or other type of basis.

With further regard to the processor component 206 of the device 102, the processor component 206 can work in conjunction with the other components (e.g., write component 110, write manager component 112, filesystem 202, memory hypervisor component 204, data store 208, and/or other component) to facilitate performing the various functions of the device 102. The processor component 206 can employ one or more processors (e.g., one or more CPUs), microprocessors, or controllers that can process information relating to data, files, applications, services, requests, file layouts, commits, extents, extent lists, offsets, notifications, alarms, alerts, preferences (e.g., user or client preferences), hash values, metadata, parameters, traffic flows, policies, defined write or file management criteria, algorithms (e.g., write or file management-related algorithms, hash algorithms, data compression algorithms, data decompression algorithms, and/or other algorithm), interfaces, protocols, tools, and/or other information, to facilitate operation of the device 102, and control data flow between the device 102 and/or other components (e.g., server, another device, node, service, user, or other entity) associated with the device 102.

With further regard to the data store 208 of the device 102, the data store 208 can store data structures (e.g., user data, metadata), code structure(s) (e.g., modules, objects, hashes, classes, procedures) or instructions, information relating to data, files, applications, services, requests, file layouts, commits, extents, extent lists, offsets, notifications, alarms, alerts, preferences (e.g., user or client preferences), hash values, metadata, parameters, traffic flows, policies, defined write or file management criteria, algorithms (e.g., write or file management-related algorithms, hash algorithms, data compression algorithms, data decompression algorithms, and/or other algorithm), interfaces, protocols, tools, and/or other information, to facilitate controlling or performing operations associated with the device 102. The data store 208 can comprise volatile and/or non-volatile memory, such as described herein. In an aspect, the processor component 206 can be functionally coupled (e.g., through a memory bus) to the data store 208 in order to store and retrieve information desired to operate and/or confer functionality, at least in part, to the write component 110, write manager component 112, filesystem 202, memory hypervisor component 204, processor component 206, data store 208, and/or other component of the device 102, and/or substantially any other operational aspects of the device 102.

With further regard to processor component 310 of the server 104, the processor component 310 can work in conjunction with the other components (e.g., file manager component 108, NAS component 302, metadata server component 304, filesystem 306, memory hypervisor component 308, data store 106, and/or other component) to facilitate performing the various functions of the server 104. The processor component 310 can employ one or more processors (e.g., one or more CPUs), microprocessors, or controllers that can process information relating to data, files, applications, services, requests, file layouts, commits, extents, extent lists, offsets, notifications, alarms, alerts, preferences (e.g., user or client preferences), hash values, metadata, parameters, traffic flows, policies, defined file management criteria, algorithms (e.g., file management-related algorithms, hash algorithms, data compression algorithms, data decompression algorithms, and/or other algorithm), interfaces, protocols, tools, and/or other information, to facilitate operation of the server 104, and control data flow between the server 104 and/or other components (e.g., device, another server, node, service, user, or other entity) associated with the server 104.

With further regard to the data store 106 of the server 104, the data store 106 can store data structures (e.g., user data, metadata), code structure(s) (e.g., modules, objects, hashes, classes, procedures) or instructions, information relating to data, files, applications, services, requests, file layouts, commits, extents, extent lists, offsets, notifications, alarms, alerts, preferences (e.g., user or client preferences), hash values, metadata, parameters, traffic flows, policies, defined file management criteria, algorithms (e.g., file management-related algorithms, hash algorithms, data compression algorithms, data decompression algorithms, and/or other algorithm), interfaces, protocols, tools, and/or other information, to facilitate controlling or performing operations associated with the server 104. The data store 106 can comprise volatile and/or non-volatile memory, such as described herein. In an aspect, the processor component 310 can be functionally coupled (e.g., through a memory bus) to the data store 106 in order to store and retrieve information desired to operate and/or confer functionality, at least in part, to the file manager component 108, NAS component 302, metadata server component 304, filesystem 306, memory hypervisor component 308, processor component 310, data store 106, and/or other component of the server 104, and/or substantially any other operational aspects of the server 104.

It should be appreciated that the data stores (e.g., data store 106, data store 208) described herein can comprise volatile memory and/or nonvolatile memory. By way of example and not limitation, nonvolatile memory can include NVMe-oF, PMEM-OF, read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

It is to be appreciated and understood that the device 102 and/or the server 104 can comprise various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions.

In certain embodiments, the file manager component 108 and/or the write manager component 112 can comprise an artificial intelligence (AI) component that can employ, build (e.g., construct, create, and/or train), and/or import AI and/or ML models, neural networks (e.g., trained neural networks), and/or or can employ AI and/or ML techniques and algorithms, to render and/or generate predictions, inferences, calculations, prognostications, estimates, derivations, forecasts, detections, and/or computations that can facilitate determining a pattern with regard to amounts of data written during write operations, determining a desirable file layout size that can be utilized for a file layout associated with a file, determining an adjustment that can be made to a file layout size of a file layout, determining resources to preallocate to a device, determining which preallocated extents or other resources can be released after a commit of a file layout, and/or making other desired determinations, including the determinations described herein, and/or automating one or more functions or features of the disclosed subject matter (e.g., automating one or more functions or features of or associated with the file manager component 108, write manager component 112, device 102, server 104, or other component), as more fully described herein.

The AI component can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component can examine the entirety or a subset of the data (e.g., data associated with files, applications, devices, servers, or users; and/or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=$confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
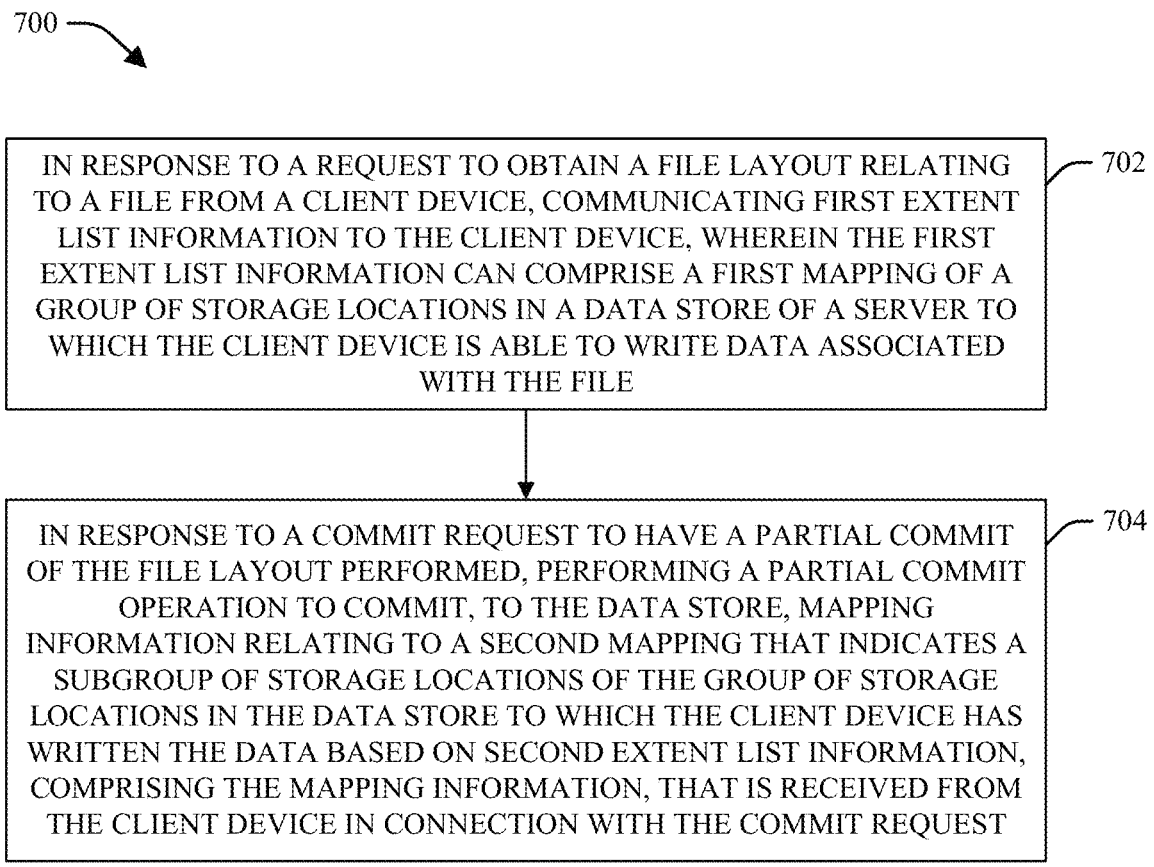
FIG. 7 illustrates a flow chart of an example method that can desirably perform and manage a partial commit of a file layout associated with a file to a data store of a server, in accordance with various aspects and embodiments of the disclosed subject matter.
Figure 8:
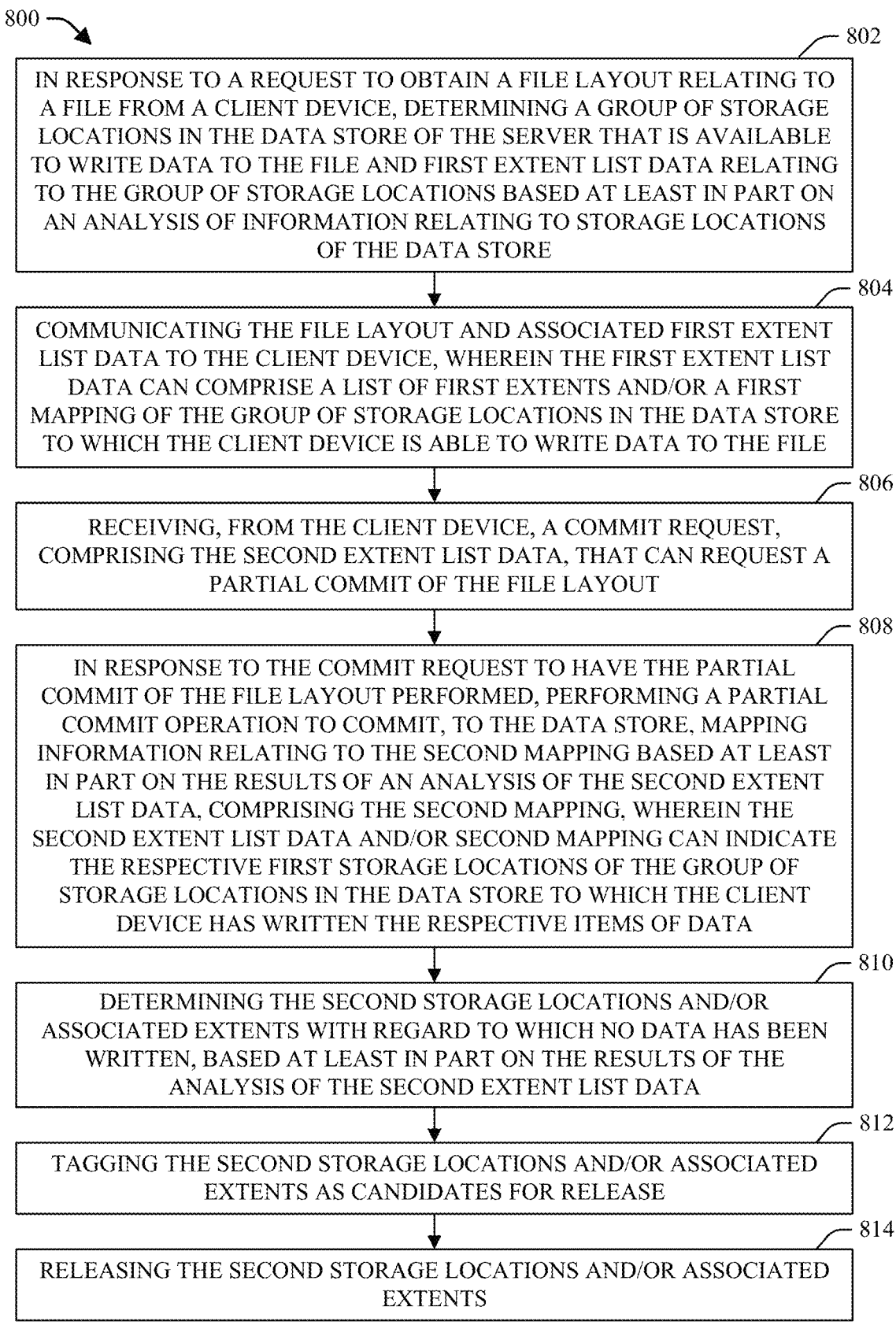
FIG. 8 presents a flow chart of another example method that can desirably perform and manage a partial commit of a file layout associated with a file to a data store of a server, in accordance with various aspects and embodiments of the disclosed subject matter.
Figure 9:
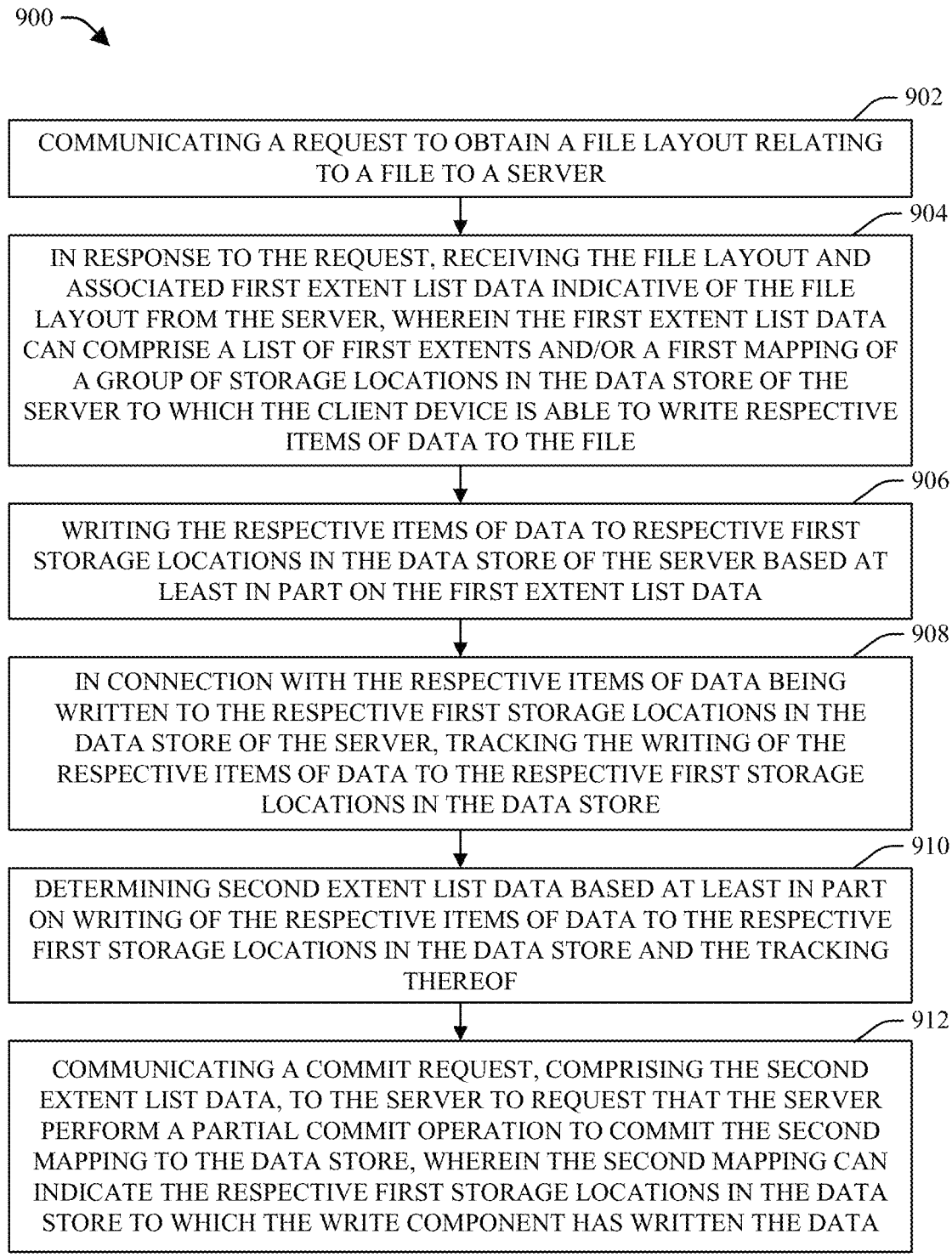
FIG. 9 illustrates a flow chart of an example method that can desirably facilitate performing and managing a partial commit of a file layout associated with a file to a data store of a server, in accordance with various aspects and embodiments of the disclosed subject matter.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can desirably (e.g., efficiently, suitably, enhancedly, or optimally) perform and manage a partial commit of a file layout associated with a file to a data store of a server, in accordance with various aspects and embodiments of the disclosed subject matter. The method 700 can be employed by, for example, a system comprising the server that can employ the file manager component, a processor component (e.g., of or associated with the file manager component), and/or data store (e.g., of or associated with the file manager component and/or the processor component).

At 702, in response to a request to obtain a file layout relating to a file from a client device, first extent list information can be communicated to the client device, wherein the first extent list information can comprise a first mapping of a group of storage locations in a data store of a server to which the client device is able to write data associated with the file. For instance, in response to the request to obtain the file layout from the client device so that the client device can write the data associated with the file to storage locations in the data store of the server, the server can communicate the first extent list information to the client device.

At 704, in response to a commit request to have a partial commit of the file layout performed, a partial commit operation can be performed to commit, to the data store, mapping information relating to a second mapping that indicates a subgroup of storage locations of the group of storage locations in the data store to which the client device has written the data based on second extent list information, comprising the mapping information, that is received from the client device in connection with the commit request. For instance, the client device can write (e.g., directly write, out of band from the server) respective items of the data to respective storage locations (e.g., respective blocks) of the subgroup of storage locations in the data store of the server. The client device can determine and generate second extent list information, comprising the mapping information relating to the second mapping that can indicate the subgroup of storage locations in the data store to which the client device has written the data. As part of the commit request, the client device can communicate the second extent list information to the server. In response to the commit request, the server can perform the partial commit operation to commit, to the data store, and store, in the data store, the mapping information relating to the second mapping.

FIG. 8 presents a flow chart of another example method 800 that can desirably (e.g., efficiently, suitably, enhancedly, or optimally) perform and manage a partial commit of a file layout associated with a file to a data store of a server, in accordance with various aspects and embodiments of the disclosed subject matter. The method 800 can be employed by, for example, a system comprising the server that can employ the file manager component, a processor component (e.g., of or associated with the file manager component), and/or data store (e.g., of or associated with the file manager component and/or the processor component).

At 802, in response to a request to obtain a file layout relating to a file from a client device, a group of storage locations in the data store of the server that is available to write data to the file and first extent list data relating to the group of storage locations can be determined based at least in part on an analysis of information relating to storage locations of the data store. For instance, the server can analyze the information relating to the storage locations of the data store, and, based at least in part on the results of such analysis, the server can determine the group of storage locations in the data store that is available to write data to the file and the first extent list data relating to the group of storage locations.

At 804, the file layout and associated first extent list data can be communicated to the client device, wherein the first extent list data can comprise a list of first extents and/or a first mapping of the group of storage locations in the data store to which the client device is able to write data to the file. For instance, the server can communicate the file layout and associated first extent list data to the client device. The first extent list data can comprise the list of first extents and/or the first mapping of the group of storage locations in the data store. The list of first extents and/or the first mapping can comprise information (e.g., extent and/or mapping information) such as, for example, device offsets associated with the group of storage locations of the data store, file offsets associated with the file, storage offsets associated with the group of storage locations, the lengths of the first extents, the states of the first extents, and/or other metadata, such as described herein.

In some instances, the client device may not write data to all of the storage locations of the group of storage locations. For instance, the client device can write respective items of data to respective first storage locations of the group of storage locations, while not writing any data to second storage locations of the group of storage locations. The client device can determine and generate second extent list data based at least in part on the writing of the respective items of data to the respective first storage locations in the data store and the tracking thereof. The second extent list data can comprise a list of the second extents and/or a second mapping that can comprise mapping information relating to the respective first storage locations in the data store to which the client device wrote the respective items of data. The list of second extents and/or the second mapping can comprise information (e.g., extent and/or mapping information) such as, for example, device offsets associated with the respective first storage locations of the data store, file offsets associated with the file, storage offsets associated with the respective first storage locations, the lengths of the second extents, and/or the states of the second extents, with regard to the respective items of data written to the respective first storage locations in the data store, such as described herein.

At 806, a commit request, comprising the second extent list data, that can request a partial commit of the file layout can be received from the client device. The server can receive the commit request and the second extent list data (e.g., as part of or in connection with the commit request) from the client device. The commit request can request a partial commit of the file layout.

At 808, in response to the commit request to have the partial commit of the file layout performed, a partial commit operation can be performed to commit, to the data store, mapping information relating to the second mapping based at least in part on the results of an analysis of the second extent list data, comprising the second mapping, wherein the second extent list data and/or second mapping can indicate the respective first storage locations of the group of storage locations in the data store to which the client device has written the respective items of data. For instance, in response to the commit request, the server can perform the partial commit operation to commit (e.g., commit and store) the mapping information relating to the second mapping to the data store based at least in part on the results of the server analyzing the second extent list data, such as described herein.

At 810, the second storage locations and/or associated extents with regard to which no data has been written can be determined, based at least in part on the results of the analysis of the second extent list data. For instance, as part of the analysis of the second extent list data, the server also can determine or identify the second storage locations of the data store and/or associated extents (and the file layout) with regard to which no data has been written.

At 812, the second storage locations and/or associated extents can be tagged as candidates for release. The server can tag or mark the second storage locations and/or associated extents as candidates for release based at least in part on the analysis results indicating that no data was written by the client device to the second storage locations and/or associated extents.

At 814, the second storage locations and/or associated extents can be released. The server can release the second storage locations and/or associated extents to enable them to be available for use to store other data associated with another file(s) by the client device or another client device.

FIG. 9 illustrates a flow chart of an example method 900 that can desirably (e.g., efficiently, suitably, enhancedly, or optimally) facilitate performing and managing a partial commit of a file layout associated with a file to a data store of a server, in accordance with various aspects and embodiments of the disclosed subject matter. The method 900 can be employed by, for example, a system comprising the server, the device (e.g., client device), the write component, the write manager component, a processor component (e.g., of or associated with the write component and the write manager component), and/or data store (e.g., of or associated with the write component, the write manager component, and/or the processor component).

At 902, a request to obtain a file layout relating to a file can be communicated to a server. For instance, a client device can communicate the request to obtain the file layout relating to the file to the server to facilitate writing data to a data store of the server.

At 904, in response to the request, the file layout and associated first extent list data indicative of the file layout can be received from the server, wherein the first extent list data can comprise a list of first extents and/or a first mapping of a group of storage locations in the data store of the server to which the client device is able to write respective items of data to the file. For instance, in response to the request, the client device can receive the file layout and associated first extent list data from the server. The list of first extents and/or the first mapping can comprise information such as, for example, device offsets associated with the group of storage locations of the data store, file offsets associated with the file, storage offsets associated with the group of storage locations, the lengths of the first extents, the states of the first extents, and/or other metadata, such as described herein.

At 906, the respective items of data can be written to respective first storage locations in the data store of the server based at least in part on the first extent list data. For instance, the client device can write the respective items of data to the respective first storage locations in the data store of the server based at least in part on the first extent list data. The respective items of data stored in the respective first storage locations can be persistent on the data store. The group of storage locations comprises the respective first storage locations and respective second storage locations, wherein the client device did not write any data to the respective second storage locations.

At 908, in connection with the respective items of data being written to the respective first storage locations in the data store of the server, the writing of the respective items of data to the respective first storage locations in the data store can be tracked. For instance, in connection with, or as part of, the respective items of data being written to the respective first storage locations in the data store of the server, the client device (e.g., employing the tracker component) can track the writing of the respective items of data to the respective first storage locations in the data store to facilitate identifying the respective first storage locations in the data store to which the client device wrote data and the respective second storage locations in the data store with regard to which the client device did not write data. In some embodiments, the client device can generate and populate (e.g., sets respective bits on) a bitmap representative of the file layout to indicate the respective first storage locations in the data store of the server to which the respective items of data have been written and the respective second storage locations in the data store with regard to which the client device did not write data, such as described herein.

At 910, second extent list data can be determined based at least in part on writing of the respective items of data to the respective first storage locations in the data store and the tracking thereof. For instance, the client device can determine the second extent list data based at least in part on the tracking of the writing of the respective items of data to the respective first storage locations in the data store of the server and/or the bitmap relating thereto. The second extent list data can comprise a list of the second extents and/or a second mapping that can comprise mapping information relating to the respective first storage locations in the data store to which the client device wrote the respective items of data. The list of second extents and/or the second mapping can comprise information (e.g., extent and/or mapping information) such as, for example, device offsets associated with the respective first storage locations of the data store, file offsets associated with the file, storage offsets associated with the respective first storage locations, the lengths of the second extents, and/or the states of the second extents, with regard to the respective items of data written to the respective first storage locations in the data store, such as described herein.

At 912, a commit request, comprising the second extent list data, can be communicated to the server to request that the server perform a partial commit operation to commit the second mapping to the data store, wherein the second mapping can indicate the respective first storage locations in the data store to which the write component has written the data. For instance, the client device can communicate, to the server, the commit request and the second extent list data (e.g., as part of or in connection with the commit request). In response to the commit request, the server can perform the partial commit operation to commit the second mapping to the data store, based at least in part on the second extent list data comprising the second mapping. The committing of the second mapping to the data store can render the second mapping persistent on the data store.

Figure 10:
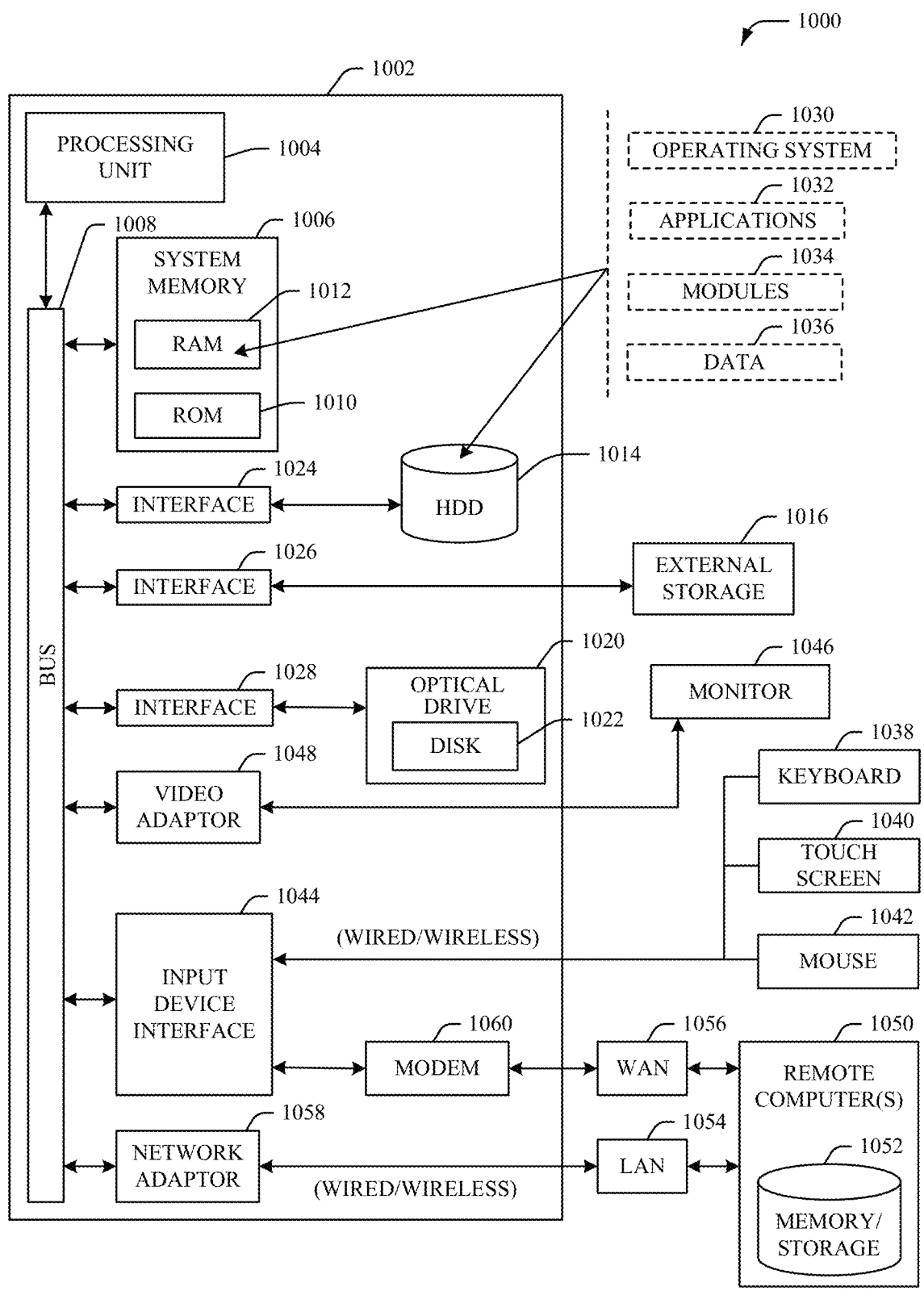
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, server, node, communication network, service, file manager component, write manager component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   in response to a request to obtain a file layout relating to a file from a client device, communicating, by a system comprising at least one processor, first extent list information to the client device, wherein the first extent list information comprises a first mapping of a group of blocks in a data store of a server, and wherein the client device is able to write data associated with the file to the group of blocks in the data store; and
   in response to a commit request to have a partial commit of the file layout performed, performing, by the system, a partial commit operation to commit, to the data store, mapping information relating to a second mapping that indicates a first subgroup of blocks of the group of blocks in the data store to which the client device has written the data based on second extent list information, comprising the mapping information, that is received from the client device in connection with the commit request, wherein the second mapping is determined based on a bitmap corresponding to the file layout of respective blocks of the group of blocks, and wherein the bitmap comprises respective bit values at respective bitmap locations of the bitmap to indicate the first subgroup of blocks to which the client device has written the data and a second subgroup of blocks, of the group of blocks, where no data has been written.

2. The method of claim 1, wherein the first subgroup of blocks contains a lower number of blocks than a number of blocks in the group of blocks.

3. The method of claim 1, further comprising:
   determining, by the system, available blocks in the data store via which the data is able to be written based on an analysis of blocks of the data store;
   determining, by the system, a device offset associated with the data store, a data store offset associated with the data store, a file offset associated with the file, or a length of an extent associated with the first extent list information based on the request and the available blocks, wherein the group of blocks comprises a portion of the available blocks, and wherein the group of blocks corresponds to the length of the extent; and generating, by the system, the first extent list information comprising the first mapping based on the available blocks, the device offset, the data store offset, the file offset, or the length of the extent.

4. The method of claim 1, further comprising:
in response to the request to obtain the file layout, preallocating, by the system, the group of blocks based on the first extent list information.

5. The method of claim 1, further comprising:
in response to receiving the commit request, comprising the second extent list information, determining, by the system, the first subgroup of blocks to which the client device has written the data and the second subgroup of blocks with regard to which the client device did not write any of the data based on an analysis of the second extent list information or the first extent list information.

6. The method of claim 5, wherein the second extent list information comprises respective extents associated with respective first blocks of the first subgroup of blocks, and wherein the respective extents indicate respective device offsets, respective data store offsets, respective file offsets, or respective lengths associated with the respective first blocks to which the client device has written the data.

7. The method of claim 5, wherein the first extent list information comprises respective extents associated with the respective blocks of the group of blocks, wherein the second extent list information comprises a first portion of the respective extents that are associated with respective second blocks of the second subgroup of blocks, and wherein the method further comprises:
from the respective first extents, determining, by the system, a second portion of the respective extents that are not present in the first portion of the respective extents, based on a comparison of the respective extents to the first portion of the respective extents, wherein the second portion of the respective extents are associated with respective first blocks of the first subgroup of blocks; and
tagging, by the system, the respective extents of the second portion of the respective extents as candidates for release.

8. The method of claim 5, wherein the data is first data, and wherein the method further comprises:
in response to the committing of the second mapping, releasing, by the system, the second subgroup of blocks to render the second subgroup of blocks available for use to store second data.

9. The method of claim 1, wherein, prior to the commit request, the data is persistently stored in the first subgroup of blocks, and wherein the performing of the partial commit operation comprises: in response to the commit request, persistently storing the mapping information relating to the second mapping in the data store.

10. The method of claim 1, further comprising:
maintaining, by the system, an in-memory state of a filesystem block mapping of a filesystem corresponding to file offsets associated with files, comprising the file, and associated with the data store.

11. A client device, comprising:
at least one memory that stores computer executable components; and
at least one processor that executes computer executable components stored in the at least one memory, wherein the computer executable components comprise:
a write component that writes respective items of data to respective first storage locations in a data store of a server based on first extent list data comprising a first mapping of a group of storage locations in the data store of the server, wherein the write component is able to write the respective items of data associated with a file to the group of storage locations in the data store, and wherein the group of storage locations comprises the respective first storage locations and respective second storage locations;
a tracker component that generates a bitmap corresponding to a layout of the group of storage locations, wherein the bitmap comprises respective bit values at respective bitmap locations of the bitmap to indicate the respective first storage locations where the write component has written the respective items of data and the respective second storage locations where the write component has not written any data; and
a commit requestor component that communicates, to the server, a commit request, comprising second extent list data, that requests the server to perform a partial commit operation to commit a second mapping that indicates the respective first storage locations in the data store to which the write component has written the data based on the second extent list data comprising the second mapping, wherein the second extent list data, comprising the second mapping, is generated based on the bitmap.

12. The client device of claim 11, wherein the write component writes the respective items of data directly to the respective first storage locations in the data store of the server out of band from the server.

13. The client device of claim 11, wherein the write component determines the group of storage locations in the data store of the server to which the write component is able to write the respective items of data associated with the file based on an analysis of the first extent list data.

14. The client device of claim 13, wherein the write component determines a device offset associated with the data store, a data store offset associated with the data store, a file offset associated with the file, or a length of an extent associated with the first extent list data based on the analysis of the first extent list data.

15. The client device of claim 11, wherein the tracker component that tracks the respective first storage locations in the data store where the write component has written the respective items of data.

16. The client device of claim 15, wherein the computer executable components further comprise:
an extent list generator component that generates the second extent list data comprising the second mapping based on the tracking of the respective first storage locations in the data store where the write component has written the respective items of data.

17. The client device of claim 16, wherein the tracker component generates the bitmap corresponding to the layout of the respective first storage locations and the respective second storage locations of the group of storage locations, wherein the tracker component sets respective first bit values at respective first bitmap locations of the bitmap to indicate the respective first storage locations in the data store where the write component has written the respective items of data, or sets respective second bit values at respective second bitmap locations of the bitmap to indicate the respective second storage locations in the data store where the write component has not written any data, and wherein the extent list generator component generates the second extent list data comprising the second mapping based on the bitmap.

18. A non-transitory machine-readable medium, comprising executable instructions that, when executed by at least one processor, facilitate performance of operations, comprising:

in response to a request to obtain a file layout relating to a file from a client device, transmitting first extent list information to the client device, wherein the first extent list information comprises a first mapping of a group of storage locations in a data store of a server, and wherein the group of storage locations in the data store is usable by the client device to write data to the file; and in response to a commit request to have a partial commit of the file layout performed, performing a partial commit operation to commit, to the data store, a second mapping that indicates a first subgroup of storage locations of the group of storage locations in the data store to which the client device has written the data based on second extent list information, comprising the second mapping, that is received from the client device in connection with the commit request, wherein the group of storage locations comprises the first subgroup of storage locations and a second subgroup of storage locations, wherein the second mapping is generated based on a bitmap corresponding to the file layout for respective storage locations of the group of storage locations, and wherein the bitmap comprises respective bit values at respective bitmap locations of the bitmap to indicate the first subgroup of storage locations to which the client device has written the data and the second subgroup of storage locations to which no data has been written.

19. The non-transitory machine-readable medium of claim 18, wherein the operations further comprise:

in response to receiving the commit request, comprising the second extent list information, determining the first subgroup of storage locations to which the client device has written the data and the second subgroup of storage locations with regard to which the client device did not write any of the data based on an analysis of the second extent list information or the first extent list information.

20. The non-transitory machine-readable medium of claim 19, wherein the second extent list information comprises respective extents associated with respective first storage locations of the first subgroup of storage locations, and wherein the respective extents indicate respective device offsets, respective data storage offsets, respective file offsets, or respective lengths associated with the respective first storage locations to which the client device has written the data.

* * * * *